(12) United States Patent
Kolbe et al.

(10) Patent No.: US 8,490,773 B2
(45) Date of Patent: Jul. 23, 2013

(54) TABLET FLOW

(75) Inventors: Sven Kolbe, Buechen (DE); Bernd Casemir-Malner, Schwarzenbek (DE); Matthias Rau, Dassendorf (DE); Jan Naeve, Gudow (DE); Thomas Heinrich, Stelle (DE)

(73) Assignee: Fette Compacting GmbH, Schwarzenbek (DE)

( * ) Notice: Subject to any disclaimer, the term of this patent is extended or adjusted under 35 U.S.C. 154(b) by 135 days.

(21) Appl. No.: 13/051,235

(22) Filed: Mar. 18, 2011

(65) Prior Publication Data

US 2011/0233027 A1   Sep. 29, 2011

(30) Foreign Application Priority Data

Mar. 23, 2010   (DE) .................. 10 2010 012 327

(51) Int. Cl.
*B65G 11/20*   (2006.01)
(52) U.S. Cl.
USPC ........... 198/355; 198/367; 198/442; 198/535; 193/13; 193/31 A
(58) Field of Classification Search
USPC .................. 198/355, 360, 367–367.2, 369.1, 198/369.2, 369.5, 442, 535; 193/13, 22, 31 R, 193/31 A, 39
See application file for complete search history.

(56) References Cited

U.S. PATENT DOCUMENTS

| | | | | |
|---|---|---|---|---|
| 1,259,421 A * | 3/1918 | McArthur | ................... | 193/31 R |
| 1,420,936 A * | 6/1922 | Morter | ........................ | 193/31 R |
| 1,538,027 A * | 5/1925 | Cushing | ........................ | 406/182 |
| 2,570,923 A * | 10/1951 | Dodge | ............................. | 193/39 |
| 2,699,891 A * | 1/1955 | Kellicott | ........................ | 198/360 |
| 2,730,223 A * | 1/1956 | Maclean | ........................ | 193/39 |
| 4,003,465 A * | 1/1977 | Bauer | ........................ | 198/442 |
| 4,147,248 A * | 4/1979 | Kurczak et al. | ............... | 198/358 |
| 4,174,920 A * | 11/1979 | Knox | ............................. | 414/160 |
| 4,771,876 A * | 9/1988 | Bandixen | ........................ | 198/367 |
| 5,078,255 A * | 1/1992 | Haley | ............................. | 198/358 |
| 5,518,102 A | 5/1996 | Hershline | | |
| 7,665,596 B2 * | 2/2010 | Kolbe et al. | ................... | 198/367 |
| 7,832,544 B2 * | 11/2010 | Kroessmann | ................. | 198/442 |

FOREIGN PATENT DOCUMENTS

| | | |
|---|---|---|
| DE | 4406561 | 9/1995 |
| DE | 102007015672 | 11/2008 |
| JP | 2000271793 | 10/2000 |

\* cited by examiner

*Primary Examiner* — Mark A Deuble

(74) *Attorney, Agent, or Firm* — Vidas, Arrett & Steinkraus, P.A.

(57) ABSTRACT

Tablet flow for the conveying away of tablets pressed in a tablet press, with a main flow channel, which has at least one branching into at least one first flow channel and at least one second flow channel separated from the first flow channel by at least one separating wall, wherein a separator is provided at the branching, which can be actuated such that tablets are directed out of the main flow channel alternatively into the first flow channel or into the second flow channel, characterized in that the separator has a guide channel for the tablets and in that a guide gear drive is provided, with which the guide channel is moveable between a first position connecting the main flow channel with the first flow channel and a second position connecting the main flow channel with the second flow channel.

8 Claims, 2 Drawing Sheets

TABLET FLOW

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a tablet flow for the conveying away of tablets pressed in a tablet press, with a main flow channel, which has at least one branching into at least one first flow channel and at least one second flow channel separated from the first flow channel by at least one separating wall, wherein a separator is provided at the branching, which can be actuated such that tablets are conveyed out of the main flow channel alternatively into the first flow channel or into the second flow channel.

Such tablet flows are used for the conveying away of tablets pressed in a tablet press and thus form the interface of the press to the periphery. In order to ensure proper production sorting of the tablet flow coming from the press, such tablet flows are often provided with at least one branching and one separator arranged in the area of the branching. The separators can be controlled by a rotary mechanism such that tablets coming from the press and conveyed in the main flow are directed alternatively into the first or second flow channel.

Based on FIG. 1, the configuration and the function of such a tablet flow will be explained according to the state of the art. The tablet flow 10' is shown in FIGS. 1a) and 1b) in two different operating positions. The tablet flow 10' has a main flow channel 12' with a channel bottom 14' and two lateral walls 16', 18'. The tablet flow 10' also has a branching 20', at which the main flow channel 12' branches into a first flow channel 22' and a second flow channel 24'. The first and second flow channels 22', 24' also each have a channel bottom 26', 28' as well as lateral guide walls 30', 32'. The first and second flow channels 22', 24' are separated from each other by a separating wall 34', which also forms a lateral guide wall of the first and second flow channel 22', 24', respectively. A separator 36' is arranged in the area of the branching 20'. The separator 36' consists of a wall element, which is rotatably arranged on the end of the separating wall 34' facing the main flow channel 12' around a rotational axis 38'. By means of an actuating drive (not shown), the separator 36' can be rotated around the rotational axis 38' out of the position shown in FIG. 1a) in the counterclockwise direction, as shown by the arrow 40' in FIG. 1b). As shown by the arrow 42' in FIG. 1, tablets 44' pressed by the press are directed through the main flow channel 12'. In the rotational position of the separator 36' shown in FIG. 1a), the tablets 44' are conveyed out of the main flow channel 12' into the first flow channel 22'. Should tablets 44' be conveyed into the second flow channel 24', the separator 36' is rotated counterclockwise by means of the actuating drive around the rotational axis 38' in FIG. 1, as shown in FIG. 1b). However, tablets 44' can thereby become jammed in the area of the separator 36'. This in turn leads to a backup, which can lead to an emergency shutdown and thus to a production downtime of the press.

Based on the explained state of the art, the object of the invention is thus to provide a tablet flow of the initially named type with which a jamming of tablets and thus a backup and production downtime are securely avoided.

This object is solved according to the invention by the subject of claim 1. Advantageous embodiments can be found in the dependent claims, the description and the figures.

For a tablet flow of the initially named type, the invention solves the object in that the separator has a guide channel for the tablets and in that a guide gear drive is provided, with which the guide channel is moveable between a first position connecting the main flow channel with the first flow channel and a second position connecting the main flow channel with the second flow channel.

For example, the tablet press can be a generally known rotary tablet press. Tablets pressed in the press and ejected out of the corresponding dies or respectively die bore holes are conveyed to the main flow channel connected with the press. They are conveyed by it up to the branching, where they are conveyed for example to a first or a second flow channel depending on the position of the separator. One of the flow channels can thereby be a so-called reject channel, into which tablets that did not pass a sensory or other quality control are directed. The reject channel can empty into a collection container for tablets to be sorted out of production. Another flow channel can empty e.g. into a collection container for tablets found to be good and thus to be used further. In the generally known manner, the main flow channel, the first flow channel and/or the second flow channel can each have a channel bottom for the receiving and conveying of the tablets and/or at least two lateral channel walls, which extend from the bottom.

BRIEF SUMMARY OF THE INVENTION

According to the invention, a separator with a guide channel is provided on the branching, which receives the tablets coming from the main flow channel and conveys them through the branching. A guide gear drive has an actuating drive, which moves the guide channel over the guide gear drive between a first and second position such that the tablets are conveyed through the guide channel alternatively into the first or second flow channel. During the movement of the guide channel between the first and second position, the tablets are thereby located already in the guide channel and are moved together with the guide channel. In this manner, the tablets are also securely conveyed during the setting operation of the separator so that the jamming of tablets is avoided. In turn, a backup of tablets is thereby prevented and production downtimes are minimized.

For a particularly secure conveying of the tablets in the guide channel, the guide channel can have a guide bottom for receiving the tablets and at least two lateral walls extending from the guide bottom. The guide channel can thereby have for example a U-shaped cross-section. Naturally, the guide channel can also be completely closed. It is also conceivable that the guide channel only has one guide bottom without lateral walls or that the guide channel only has side walls without a guide bottom. For further improvement of the tablet conveyance in the guide channel and thus in the area of the branching, the guide channel can be arranged with its end facing away from the main flow channel in the first position in or on the first flow channel and can be arranged in the second position in or on the second flow channel. The guide channel thus opens in the first or respectively second position into the first or respectively second flow channel without forming a gap or a space from the end of the first or respectively second flow channel, in particular of a bottom and/or lateral walls of the first or respectively second flow channel, facing the main flow channel.

According to another embodiment, the guide channel can at least occasionally take up a position at a distance from the separation wall in the case of a movement between the first position and the second position with its end facing the main flow channel. Such a distance between the guide channel and the end of the separation wall facing the main flow channel between the flow channels ensures that no tablets can be jammed between the end of the guide channel and the separation wall during switching between the first and second flow channel. Different embodiments are possible for realizing such a distance. It can thus be provided for example that the guide channel with its end facing away from the main flow channel is rotatably mounted around a first rotational axis on a first end of a coupling bar, wherein the second end of the coupling bar is rotatably mounted around a second rotational axis on the separating wall, and wherein an actuating drive is provided, which rotates the coupling bar for movement of the guide channel between the first and the second position around the second rotational axis. It is also possible that the guide channel with its end facing away from the main flow channel is rotatably mounted around a first rotational axis on an eccentric, wherein the eccentric is rotatably mounted around a second rotational axis on the separating wall, and wherein an actuating drive is provided, which rotates the eccentric for movement of the guide channel between the first and the second position around the second rotational axis. The guide gear drive can thus be a coupling or eccentric gear drive. The actuating drive provided for gear drive actuation can be for example an (electric) actuator. The rotational movement of the actuating drive is transmitted via the coupling bar or the eccentric into a combined rotational and linear movement of the separator or respectively of the guide channel. The eccentric is in particular an eccentric disk, the first rotational axis of which can be arranged eccentrically to the second rotational axis around which the disk is rotated.

In contrast to the state of the art, the separator is thus no longer mounted centrically on a shaft, but is rather guided in an elongated hole, wherein the actuation of the separator or respectively the guide channel between the first and second position takes place via a circular path. The circular progression is thereby designed such that the end of the guide channel facing the separating wall during the movement between the first and second position forms a gap or respectively space to the separating wall between the first and second flow channel. This gap only closes again when the actuation of the guide channel is complete. However, at this time the tablet flow conveyed in the guide channel is already completely switched so that the jamming of the tablets is securely prevented.

It is for example possible that the first flow channel and the second flow channel are arranged next to each other. But, it is also conceivable that the first flow channel and the second flow channel are arranged one above the other.

Moreover, the invention relates to a tablet press comprising at least one tablet flow according to the invention.

BRIEF DESCRIPTION OF THE SEVERAL VIEWS OF THE DRAWINGS

One exemplary embodiment of the invention is explained below in greater detail using figures. The drawing shows schematically in.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

If not specified otherwise, the same reference numbers are used for the same objects in the figures. A tablet press 100 is shown extremely schematically in FIG. 2. The tablet press 100 in the example shown is a rotary press of the generally known type. Thus, it will not be explained further. The tablet press 100 has a tablet flow that can be identified with reference number 10 in FIG. 2, via which tablets 44 pressed in the tablet press 100 can be conveyed to at least one collection container 102.

Figure 1:
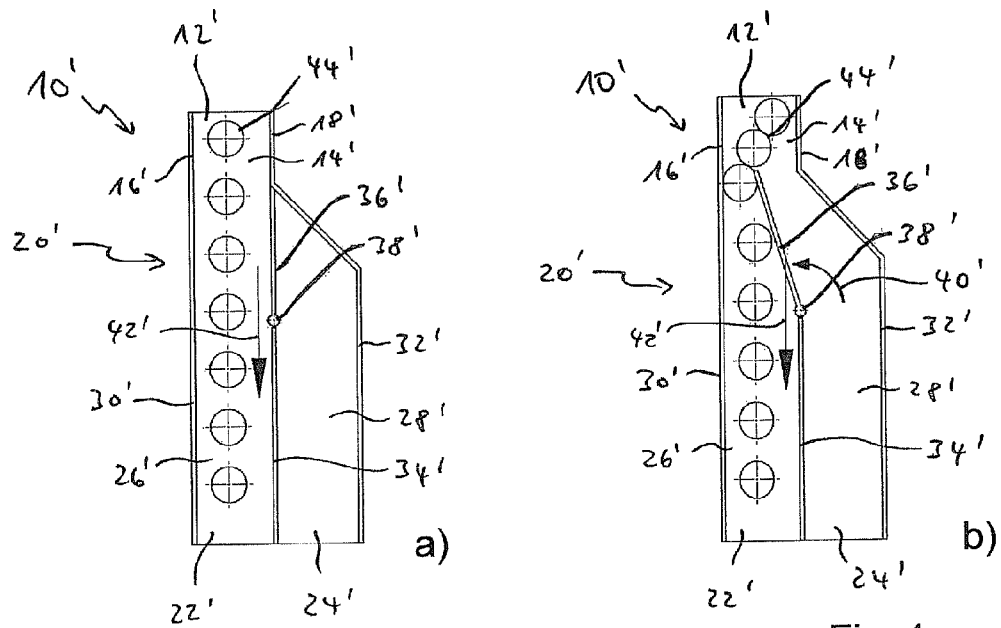
FIG. 1 a tablet flow according to the state of the art in two operating positions in a top view, FIG. 2 a tablet press according to the invention in a vertical cut view, FIG. 3 a tablet flow according to the invention in a first operation position in a top view, FIG. 4 the tablet flow from FIG. 3 in a second operating position and FIG. 5 the tablet flow from FIG. 3 in a third operating position.
Figure 2:
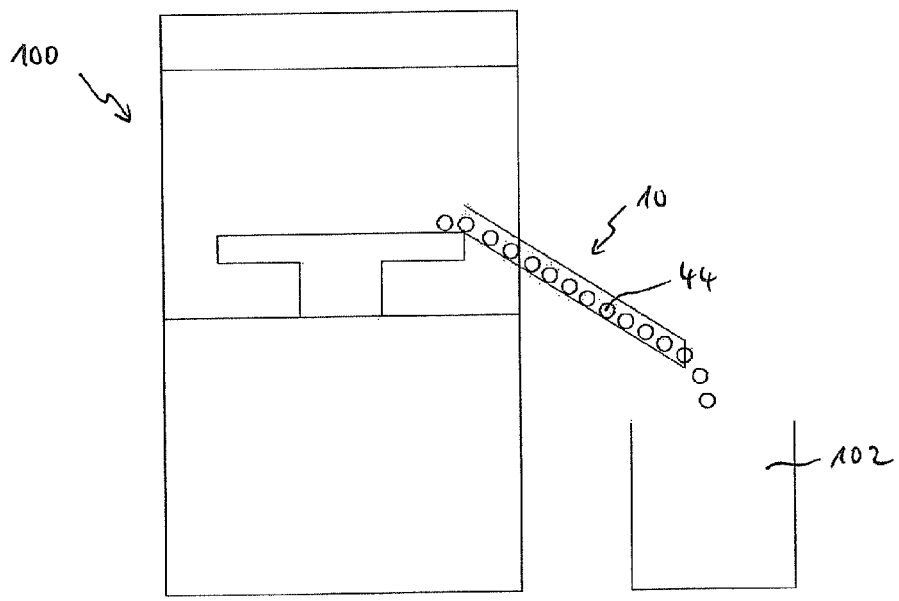

The tablet flow 10 shown in FIG. 2 will be explained in greater detail using FIGS. 3, 4 and 5. The tablet flow 10 has a main flow channel 12 that is connected with the tablet press. The main flow channel 12 has a channel bottom 14 for receiving the tablets 44 pressed in the press as well as two lateral channel walls 16, 18. It has a U-shaped cross-section. The tablet flow 10 also has a branching shown with reference number 20, on which the main flow channel 12 branches into the first flow channel 22 and a second flow channel 24. The first and second flow channels also each have a channel bottom 26, 28 for receiving the tablets as well as a lateral channel wall 30, 32. They also each have a U-shaped cross-section. The first and second flow channels 22, 24 are separated from each other by a separating wall 34, which also forms a lateral delimiting wall of the first and second flow channel 22, 24, respectively.

A separator 36 is also provided in the area of the branching 20. The separator 36 comprises a guide channel 46, which has a guide bottom 48 and in the example shown two lateral guide walls 50, 52. The guide channel also has a U-shaped cross-section. With its end facing away from the main flow channel 12, the guide channel 46 is rotatably mounted around a first rotational axis 54 on a first end of a coupling bar 56. The second end of the coupling bar 56 is rotatably mounted around a second rotational axis 58 on the end of the separating wall 34 facing the main flow channel 12 between the first and second flow channels 22, 24. By means of an actuating drive (not shown), for example of an electric actuator, the coupling bar 56 can be rotated around the second rotational axis 58 for the movement of the guide channel 46.

The function of the tablet flow 10 according to the invention will now be explained in greater detail. Tablets 44 pressed in the tablet press 100 are directed into the main flow channel 12 and by it to the branching 20. The conveying direction of the tablets is indicated schematically by the arrow 42 in FIGS. 3 through 5. In the first position of the guide channel 46 shown in FIG. 3, the tablets 44 are conveyed out of the main flow channel 12 into the first flow channel 22 connected with it. It can be seen that the guide channel 46 in this first position with its end facing away from the main flow channel 12 rests against the beginning of the first flow channel 22 formed by the end of the separating wall 34 facing the main flow channel 12. It can also be seen that the flow channel 46 in this first position with its first lateral wall 50 rests directly against the lateral wall 16 of the main flow channel 12 associated with it and with its second lateral wall 52 closes the access to the second flow channel 24.

Figure 3:
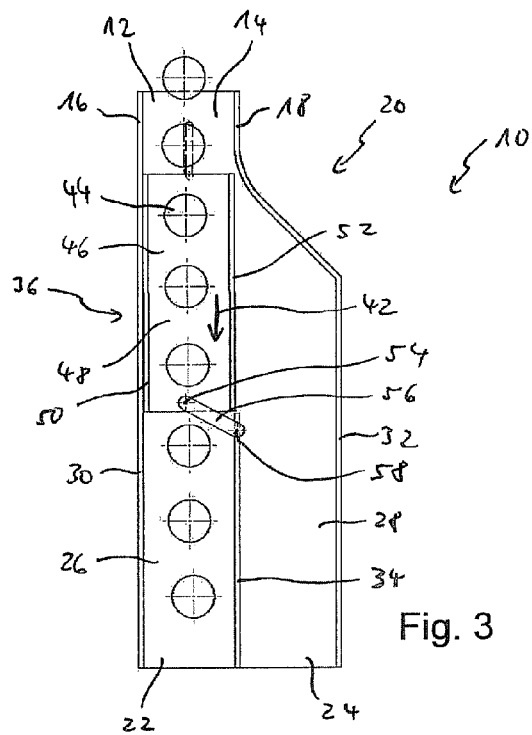
Figure 4:
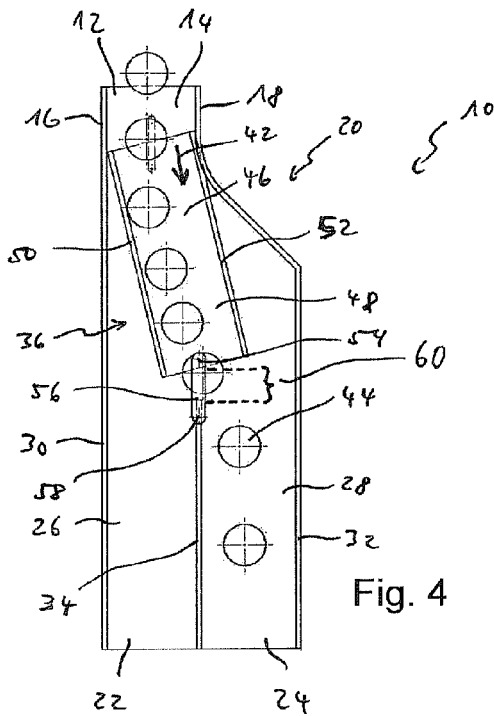
Figure 5:
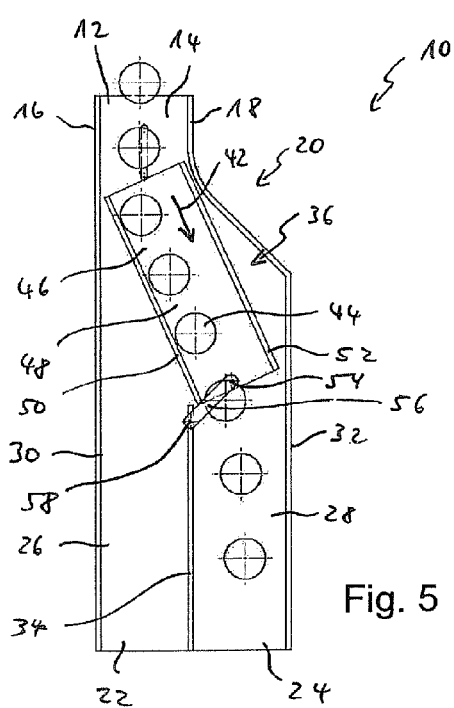

In order to now direct tablets 44 out of the main flow channel 12 into the second flow channel 24, the coupling bar 56 is rotated around the second rotational axis 58 by means of the actuating drive, clockwise in FIGS. 3 through 5. FIG. 4 shows an intermediate position of the guide channel 46 between its first position and its second position connecting the main flow channel 12 with the second flow channel 24. It can be seen that the rotational movement of the actuating drive around the second rotational axis 58 is transmitted via the coupling bar 56 into a combined rotational and linear movement of the guide channel 56. In particular, the guide channel 56 is moved into the main flow channel 12 approximately around the length of the coupling bar 56 so that a space is created, which is shown with reference number 60 in FIG. 4, in the intermediate position shown in FIG. 4 between the end of the guide channel 46 facing away from the main flow channel 12 and the end of the separating wall 34 facing the main flow channel 12. FIG. 4 also shows that the tablets 44 coming from the main flow channel 12 are conveyed through the guide channel 46, in particular its side wall 50, in the direction of the second flow channel 24, wherein the tablets 44 already located in the branching 20 at the beginning of the setting operation of the separator 36 are also diverted. It can also be seen that a jamming of tablets 44 between the bottom end of the guide channel 46 in FIG. 4 and the top end of the separating wall 34 in FIG. 4 is securely prevented due to the separation distance 60.

FIG. 5 shows the state of the guide channel 46 completely moved into the second position. It can be seen that the separation distance 60 is closed again by the coupling gear drive formed with the coupling bar 56. Thus, the guide channel 46 with its end facing away from the main flow channel 12 in the second position shown in FIG. 5 is in turn arranged at the beginning of the second flow channel 24, which is formed by the end of the separating wall 34 facing away from the main flow channel 12. In this operating position, tablets 44 coming from the main flow channel 12 are directed into the second flow channel 24.

Please note that, despite the fact that the first and second flow channels 22, 24 are arranged next to each other in the figures, they can of course also be arranged above each other. The function and the configuration of the tablet flow 10 matches that of the function explained above.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A tablet flow (10) for the conveying away of tablets pressed in a tablet press (100), the tablet press comprising a main flow channel (12), which has at least one branching (20) into at least one first flow channel (22) and at least one second flow channel (24) separated from the first flow channel (22) by at least one separating wall (34), wherein a separator (36) is provided at the branching (20), which can be actuated such that tablets (44) are conveyed out of the main flow channel (12) alternatively into the first flow channel (22) or into the second flow channel (24),
wherein the separator (36) has a guide channel (46) for the tablets (44) and in that a guide gear drive is provided, with which the guide channel (46) is moveable between a first position connecting the main flow channel (12) with the first flow channel (22) and a second position connecting the main flow channel (12) with the second flow channel (24)
further wherein the guide channel (46) with its end facing away from the main flow channel (12) is arranged in the first position in or on the first flow channel (22) and is arranged in the second position in or on the second flow channel (24).

2. The tablet flow according to claim 1, wherein the guide channel (46) has a guide bottom (48) for receiving the tablets (44) and at least two lateral walls extending from the guide bottom.

3. The tablet flow according to claim 1, wherein the guide channel (46) at least occasionally takes up a position at a distance from the separation wall (34) in a movement between the first position and the second position with its end facing away from the main flow channel (12).

4. The tablet flow according to claim 3, wherein the guide channel (46) with its end facing away from the main flow channel (12) is rotatably mounted around a first rotational axis (54) on a first end of a coupling bar (56), wherein the second end of the coupling bar is rotatably mounted around a second rotational axis (58) on the separating wall (34), and wherein an actuating drive is provided, which rotates the coupling bar (56) for movement of the guide channel (46) between the first and the second position around the second rotational axis (58).

5. The tablet flow according to claim 3, wherein the guide channel (46) with its end facing away from the main flow channel (12) is rotatably mounted around a first rotational axis (54) on an eccentric, wherein the eccentric is rotatably mounted around a second rotational axis (58) on the separating wall (34), and wherein an actuating drive is provided, which rotates the eccentric for movement of the guide channel (46) between the first and the second position around the second rotational axis (58).

6. The tablet flow according to claim 1, wherein the first flow channel (22) and the second flow channel (24) are arranged next to each other.

7. The tablet flow according to claim 1, wherein the first flow channel (22) and the second flow channel (24) are arranged above each other.

8. In combination with the tablet flow (10) of claim 1, a tablet press.

\* \* \* \* \*